US012109939B2

(12) United States Patent
McDonald

(10) Patent No.: US 12,109,939 B2
(45) Date of Patent: Oct. 8, 2024

(54) LIGHT ENGINE ASSEMBLY FOR AUTOMOTIVE INTERIOR

(71) Applicant: Ford Global Technologies, LLC, Dearborn, MI (US)

(72) Inventor: Patrick McDonald, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 727 days.

(21) Appl. No.: 17/228,355

(22) Filed: Apr. 12, 2021

(65) Prior Publication Data

US 2022/0324378 A1  Oct. 13, 2022

(51) Int. Cl.
| | |
|---|---|
| *B60Q 3/14* | (2017.01) |
| *B29C 45/16* | (2006.01) |
| *B60R 13/02* | (2006.01) |
| *F21V 3/10* | (2018.01) |
| *F21V 15/015* | (2006.01) |
| *F21V 31/00* | (2006.01) |
| *B29L 31/30* | (2006.01) |

(52) U.S. Cl.
CPC ............ *B60Q 3/14* (2017.02); *B29C 45/1676* (2013.01); *B60R 13/02* (2013.01); *F21V 3/10* (2018.02); *F21V 15/015* (2013.01); *F21V 31/005* (2013.01); *B29L 2031/3008* (2013.01); *B60R 2013/0287* (2013.01)

(58) Field of Classification Search
CPC ...... B60Q 1/0035; B60Q 1/26; B60Q 1/2653; B60Q 1/2696; B60Q 3/14; F21V 15/015; F21V 31/00; F21V 3/10
See application file for complete search history.

(56) References Cited

U.S. PATENT DOCUMENTS

| | | | |
|---|---|---|---|
| 8,113,695 B2 | 2/2012 | Meinke et al. | |
| 8,627,586 B2 | 1/2014 | Bozio et al. | |
| 10,562,446 B2 | 2/2020 | Cannon | |
| 2012/0280528 A1 | 11/2012 | Dellock et al. | |
| 2013/0260112 A1 | 10/2013 | Lee et al. | |
| 2015/0022994 A1* | 1/2015 | Bingle | G01D 13/20 362/23.01 |
| 2015/0274066 A1 | 10/2015 | Del Pozo Gonzalez et al. | |
| 2019/0061646 A1 | 2/2019 | Huttenlocher | |
| 2019/0329701 A1* | 10/2019 | Garcia Garcia | B60Q 1/2611 |

FOREIGN PATENT DOCUMENTS

EP  3053778 B1  10/2019

* cited by examiner

*Primary Examiner* — William J Carter
(74) *Attorney, Agent, or Firm* — Vichit Chea; Price Heneveld LLP

(57) ABSTRACT

A method for forming a light engine assembly includes the steps of injecting a light trough material into a mold, thereby forming a light trough including a trough body having an edge, and injecting a seal material into the mold, thereby forming a seal configured to bond with the edge of the trough body. The method further includes cooling one of the light trough material and the seal material to adhere the light trough material to the seal material, thereby forming a unitary light trough part, ejecting the light trough part, and coupling a lighting unit with the light trough part.

20 Claims, 7 Drawing Sheets

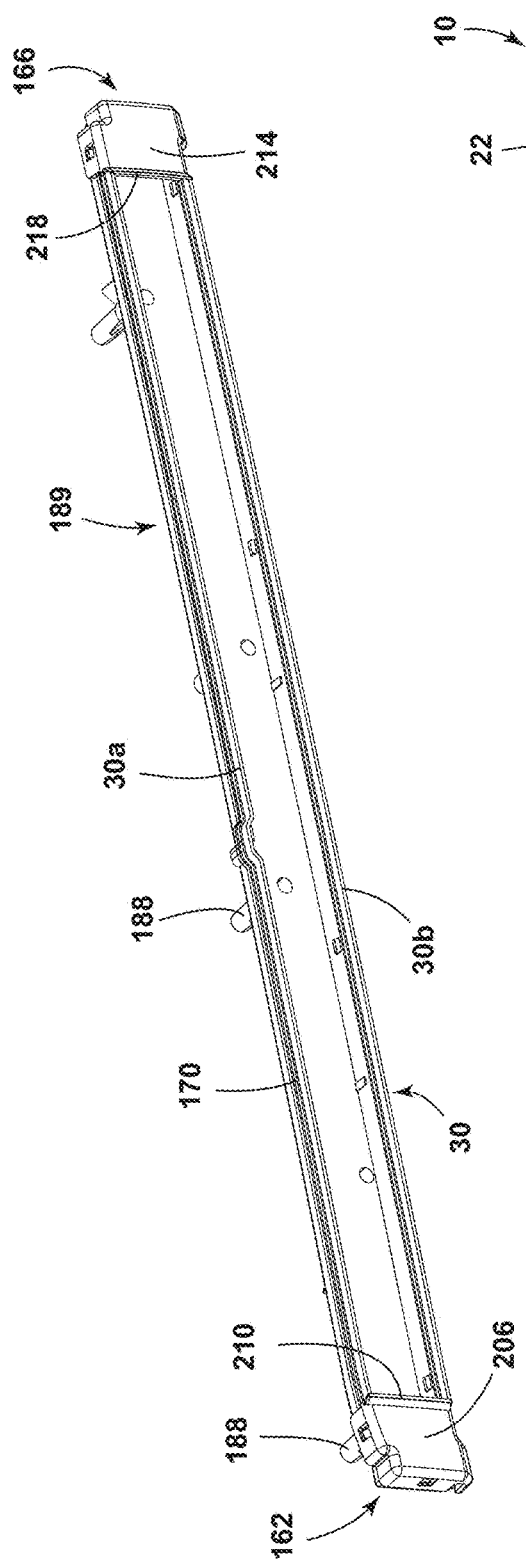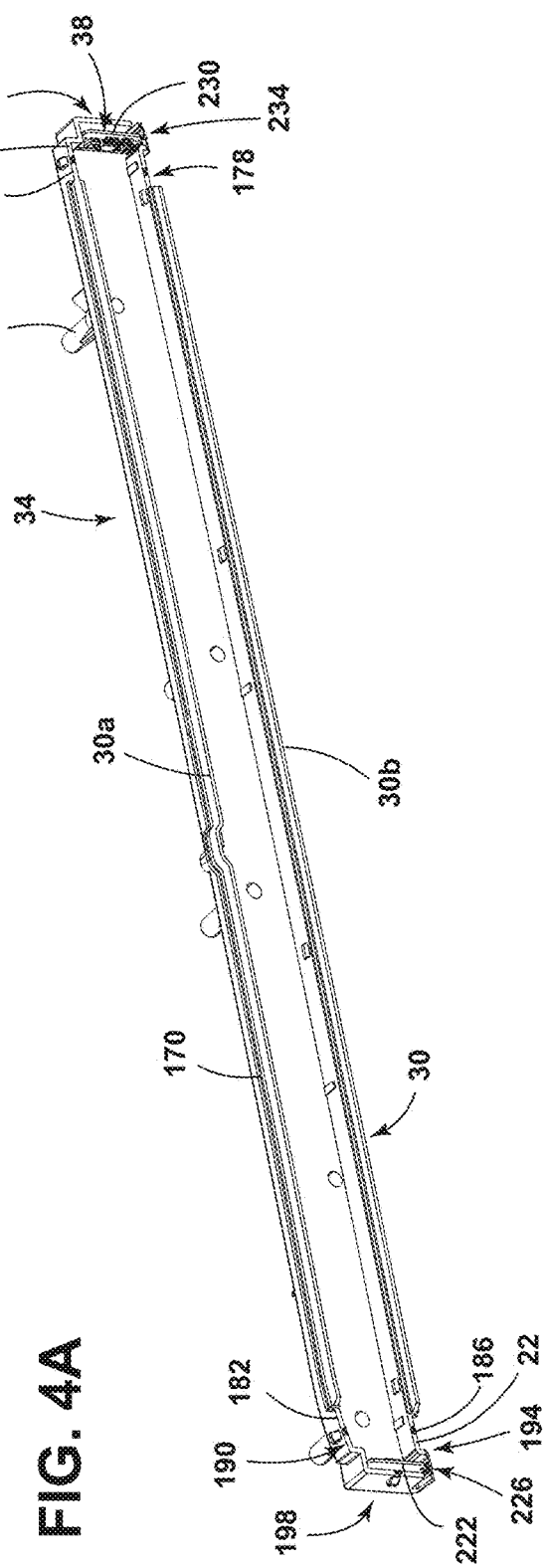
FIG. 4A
FIG. 4B

LIGHT ENGINE ASSEMBLY FOR AUTOMOTIVE INTERIOR

FIELD OF THE DISCLOSURE

The present disclosure generally relates to a method for forming a light engine assembly, and more specifically, to a method for forming a light engine assembly for a trim panel of a vehicle interior.

BACKGROUND OF THE DISCLOSURE

Interior trim panels are used to finish interior surfaces in an automotive vehicle passenger compartment. The trim panels, which can include instrument panels and door panels, may include a lighting assembly configured to illuminate for decorative and/or informational purposes. The lighting assembly may include a light engine configured to provide a source of light.

SUMMARY OF THE DISCLOSURE

According to one aspect of the present disclosure, a method for forming a light engine assembly for a vehicle trim panel includes the steps of injecting a light trough material into a trough mold, thereby forming a light trough including a trough body having first and second longitudinal edges, and injecting a seal material into the trough mold, thereby forming first and second seals configured to couple the first and longitudinal edges of the trough body, respectively. The seal material is different from and compatible with the light trough material. The method further includes the steps of cooling one of the light trough material and the seal material to form a bond between the light trough material and the seal material, thereby forming a unitary light trough part, ejecting the light trough part, coupling a lighting unit with the light trough part, and assembling the light engine assembly on the vehicle trim panel.

Embodiments of this aspect and/or the other aspects of the disclosure can include any one or a combination of the following features:
  injecting an end cap material into an end cap mold, thereby forming an end cap configured to couple an end of the trough body, injecting a seal material into the end cap mold, thereby forming an end seal configured to couple the first and second seals of the light trough part, wherein the seal material is different from and compatible with the end cap material, cooling one of the end cap material and the seal material to form a bond between the cap material and the seal material, thereby forming a unitary end cap part, ejecting the end cap part, coupling the end cap part with the light trough part;
  coupling a first end cap part with a first end of the light trough part and coupling a second end cap part with a second end of the light trough part;
  forming at least one heat stake projecting from a B-side of the trough body;
  the light trough material includes a plastic and the seal material includes an elastomer;
  the first and second seals prevent light from the lighting unit from leaking to an exterior side of the light trough when the first and second seals are directly coupled with a lens; and
  the vehicle trim panel is coupled with an instrument panel.

According to another aspect of the present disclosure, a method for forming a light engine assembly including the steps of injecting a light trough material into a mold, thereby forming a light trough including a trough body having an edge, injecting a seal material into the mold, thereby forming a seal configured to bond with the edge of the trough body, cooling one of the light trough material and the seal material to adhere the light trough material to the seal material, thereby forming a unitary light trough part, ejecting the light trough part and coupling a lighting unit with the light trough part.

Embodiments of this aspect and/or the other aspects of the disclosure can include any one or a combination of the following features:
  forming at least one heat stake projecting from a B-side of the trough body;
  the light trough material includes a plastic and the seal material includes an elastomer;
  the seal prevents light form the lighting unit from leaking to an exterior side of the light trough when the seal is directly coupled with a lens; and
  coupling the light engine assembly with a lens and a backplate, thereby forming a light bar and coupling the light bar with a vehicle trim panel.

According to another aspect of the present disclosure, a vehicle trim panel includes a lighting assembly. The lighting assembly includes a lens having a body defining a lens A-side and a lens B-side and a light engine. The light engine includes a light trough including a trough body defining a perimeter, a seal bonded to the perimeter of the light trough and a lighting unit disposed within the trough body and configured to emit light. The lighting assembly further includes a backplate. The light engine is disposed between the lens B-side and the backplate and the seal contacts the lens and prevent emitted light from the lighting unit from leaking to an exterior side of the light trough.

Embodiments of this aspect and/or the other aspects of the disclosure can include any one or a combination of the following features:
  the vehicle trim panel is coupled with an instrument panel;
  an applique disposed on the lens including a pattern having optically transparent portions, wherein emitted light from the lighting unit is transmitted through the transparent portions;
  a first end cap defining a first end cap defining a first end cap body and having a first end seal coupled with a first end of the light trough; and a second end cap defining a second end cap body having a second end seal coupled with a second end of the light trough, wherein the first and second end seals are bonded to the first and second end cap bodies, respectively;
  the seal bonded to the perimeter of the light trough further includes an upper seal and a lower seal, wherein the first and second end seals align with the upper seal and the lower seal, thereby forming a continuous perimeter;
  the perimeter includes a flange;
  the backplate curves around the lens; and
  blackout paint is applied to the lens B-side and defines an illumination boundary around the light engine.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 4A is a front perspective view of a light engine assembly, according to various examples;

FIG. 4B is a front perspective view of the light engine assembly of FIG. 4A shown without end caps;

DETAILED DESCRIPTION OF THE PREFERRED EMBODIMENTS

Figure 1:
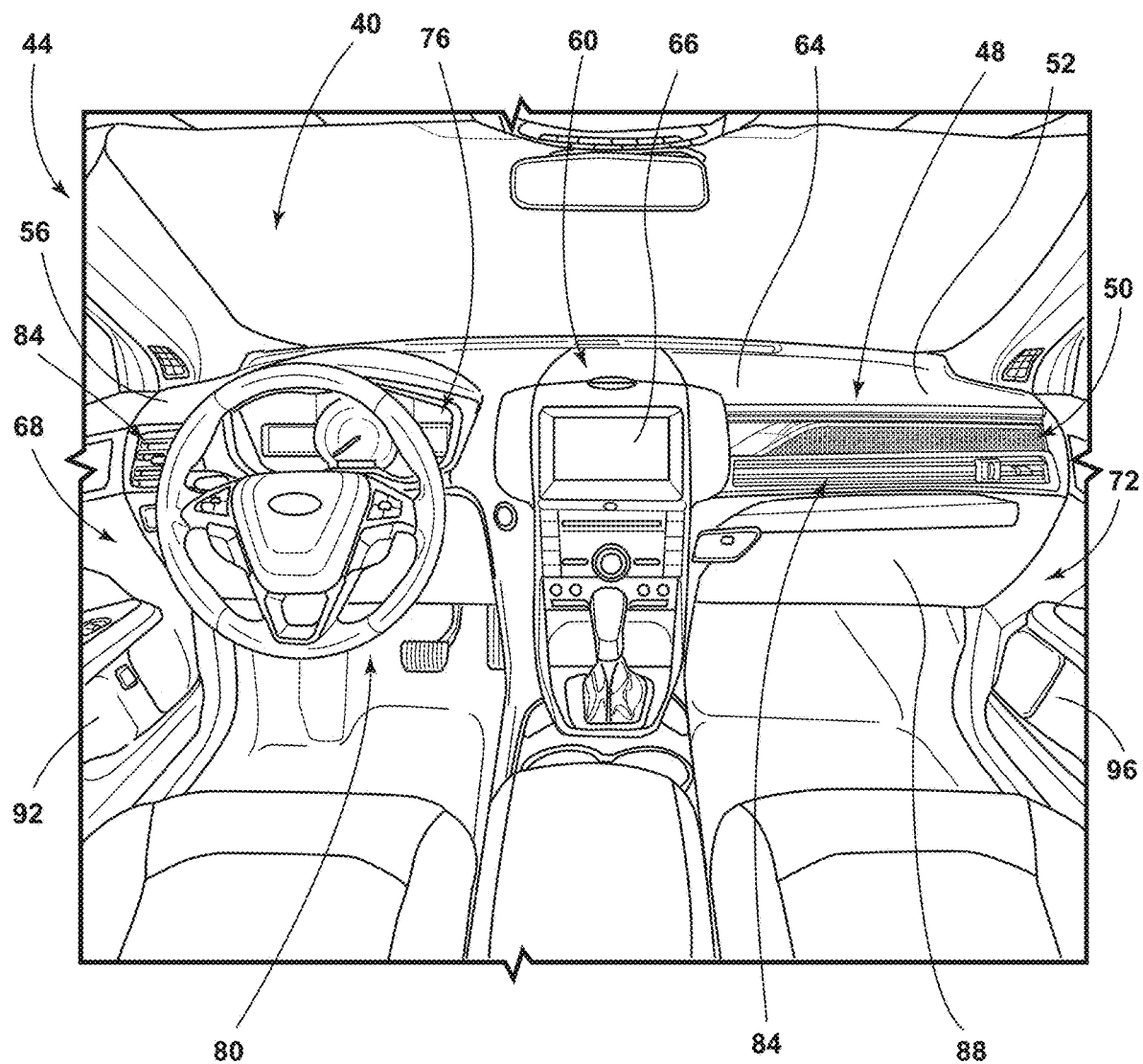
FIG. 1 is a front perspective view of a vehicle cabin including a vehicle trim panel, according to various examples.

The present illustrated embodiments reside primarily in combinations of method steps and apparatus components related to a lighting assembly including a light engine assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-5, reference numeral 10 generally designates a light engine assembly. A method 300 for forming the light engine assembly 10 includes the steps of injecting a light trough material into a mold, thereby forming a light trough 14 including a trough body 18 having a perimeter defining an edge 22 and injecting a seal material into the mold, thereby forming a seal 30 configured to bond with the edge 22 of the trough body. The method 300 further includes the steps of cooling one of the light trough material and the seal material to adhere the light trough material to the seal material, thereby forming a unitary light trough part 34, ejecting the light trough part 34 and coupling a lighting unit 38 with the light trough part 34.

Referring now to FIG. 1, an interior cabin 40 of a vehicle 44 is exemplarily illustrated. The vehicle 44 includes an instrument panel assembly 48, or dashboard, including an instrument panel body 52. The instrument panel assembly 48 is located vehicle forward in the cabin 40 and includes a driver-side portion 56, a center stack portion 60, and a passenger-side portion 64. These portions of the instrument panel body 52, and particular regions or locations within them, often have differing mechanical property requirements. As illustrated, the instrument panel assembly 48 includes a trim panel 50 including the light engine assembly 10. However, it is within the scope of the disclosure for the light engine assembly 10 to be included in any component of the vehicle 44, including other interior trim panels, such as a door panel. Further, aspects of the light engine assembly 10 are not limited for use in vehicles and may be utilized in any suitable lighting assembly.

The driver-side and passenger-side portions 56, 64 of the instrument panel body 52 are in substantial proximity to respective driver-side and passenger-side regions 68, 72 of the vehicle 44. The center stack portion 60 is connected to both the driver-side portion 56 and the passenger-side portion 64 of the instrument panel body 52 such that the center stack portion 60 is positioned between the driver-side portion 56 and the passenger-side portion 64 of the instrument panel body 52. The center stack portion 60 may include a display 66. While the instrument panel assembly 48 is illustrated in an exemplary vehicle 44, it is contemplated that the vehicle 44 may be any type of vehicle, In various examples, the vehicle 44 is a wheeled motor vehicle 44, which may be a sedan, a sport utility vehicle, a truck, a van, a crossover, and/or other styles of vehicle. However, the vehicle 44 may be a plane, boat, etc. without departing from the scope of the present disclosure.

The driver-side portion 56 of the instrument panel body 52 may include an instrument cluster 76, covering for the instruments (e.g., an instrument cluster hood), and other similar components. A steering column 80 may be supported by one or both of the instrument panel body 52 and a cross-car beam assembly positioned within the instrument panel body 52. The steering column 80 may engage a steering system (not shown) vehicle forward of the instrument panel assembly 48. The instrument panel assembly 48 may further include an HVAC system having a plurality of air vents 84 located within the instrument panel body 52. The HVAC system may be positioned vehicle forward of the instrument panel body 52 and/or may be partially received by the instrument panel body 52. As also depicted in FIG. 1, the passenger-side portion 64 of the instrument panel body 52 may include a glove box assembly 88.

As used in this disclosure, "outboard" refers to the lateral sides or regions most proximate to a driver-side door 92 and a passenger-side door 96 in the vehicle 44. The term "inboard" as used in this disclosure refers to a central area in the vehicle 44 inboard from the laterally opposing outboard sides or regions.

Figure 2:
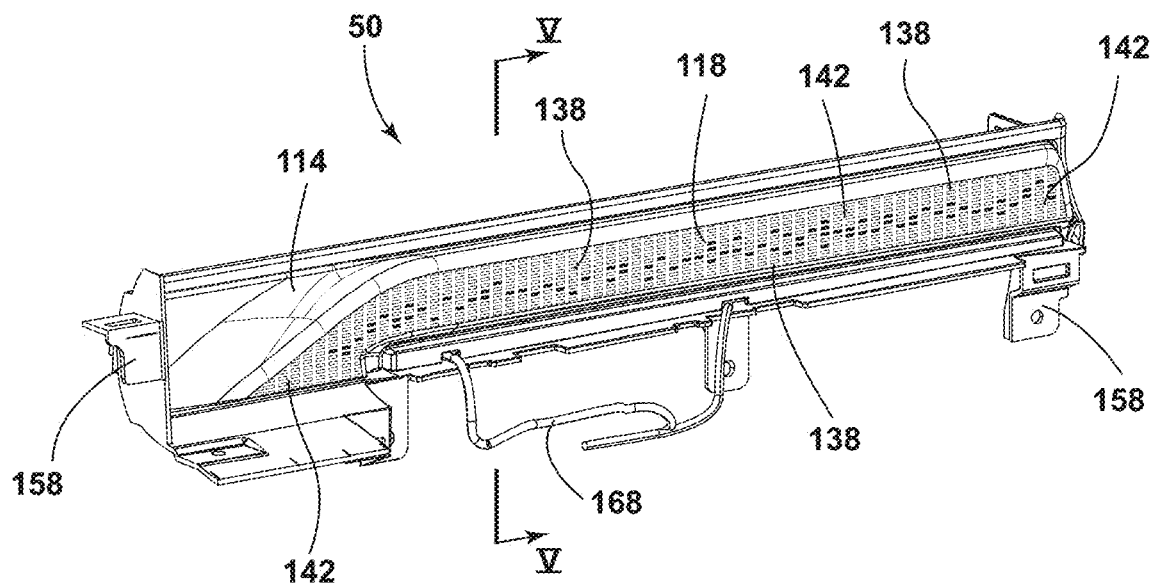
FIG. 2 is a front perspective view of the vehicle trim panel of FIG. 1.
Figure 3:
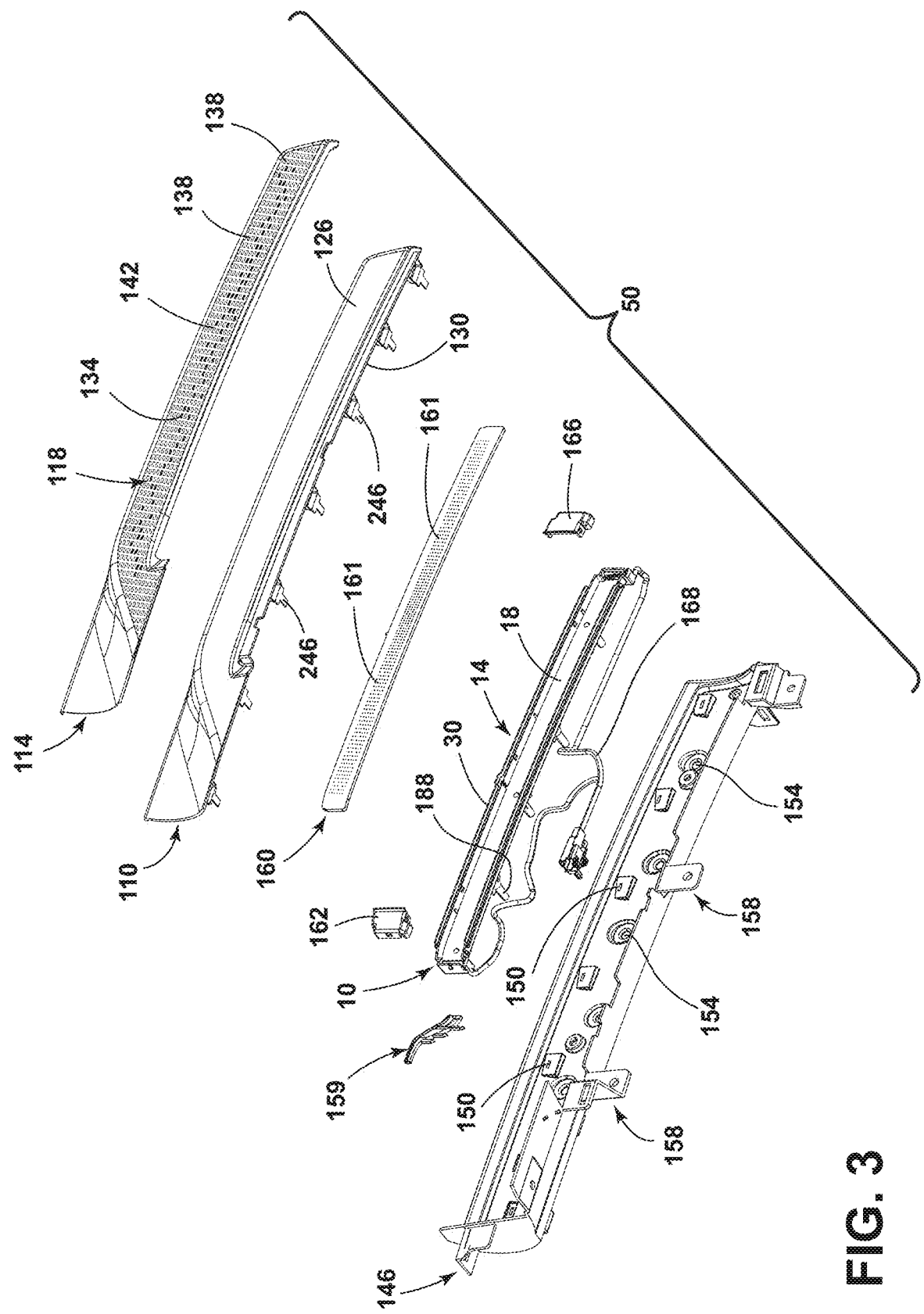
FIG. 3 is an exploded, front perspective view of the vehicle trim panel of FIG. 2.

Referring to FIGS. 2 and 3, a perspective view and an exploded view of the trim panel 50 are illustrated. The trim panel 50 may include a substrate 110 that receives a prefabricated skin 114 and a decorative appliqué 118. The substrate 110 includes a lens 122, which is transparent on at least a portion thereof. In some aspects, the lens 122 is partially transparent, having a transmittance of approximately 60-90% such that the lens 122 is diffusive. The lens 122 may have a transmittance in the range of approximately 70-80%. In specific examples, the transmittance of the lens 122 is approximately 77%. The lens 122 defines a lens A-side 126 (front facing) and a lens B-side 130 (rear facing). When assembled onto the vehicle 44, the lens A-side 126 faces the cabin 40. In some examples, the substrate 110, the skin 114, and the appliqué 118 are individually made and then assembled together as a unit.

The substrate 110 may be molded in a conventional manner, which may include injection molding a plastic, such as acrylonitrile butadiene styrene (ABS), with a suitable rigidity and having features for attaching the trim panel 50 to the instrument panel 48, doors 92, 96, etc. The skin 114 may be made of a thermoplastic polyolefin (TPO) or other conventional materials, including other forms of polypropylene or polyethylene. The appliqué 118 may be coupled with the lens 122 (e.g. disposed on, bonded to, or integral with, the lens 122). In some examples, the appliqué 118 is attached to the trim panel 50 skin during a negative-vacuum forming process followed by attachment of the skin 114 to the substrate 110 before shrinkage of the skin 114 can occur. The appliqué 118 can be an injection-molded rigid part, which can be flexible, and may be formed of any suitable material that can withstand heat applied to the skin material. The appliqué 118 may include a composite structure having an insert 134 on one surface, or it may consist of a single layer. The appliqué 118 may further include various single or multi-layer films that can be coated or colored. Optionally, the appliqué 118 is formed from a die-cut film, foil, or other prefabricated material(s). The appliqué 118 may define a pattern 134 having optically transparent portions 138 and opaque portions 142. Light emitted from the lighting unit 38 can be transmitted through the transparent portions 138. In some aspects, the optically transparent portions 138 include a diamond pattern. The appliqué 118 may also be formed as a composite article using conventional technology, such as an injection-molded carrier with optional films, inserts, and coatings.

As illustrated, the trim panel 50 further includes a backplate 146. The backplate 146 can define a plurality of apertures 150, 154, which may be configured to receive tabs and stakes of the light engine assembly 10 and the substrate 110, or lens 122. Therefore, the backplate 146 can be coupled with the light engine assembly 10 and the lens 122. Additionally, the backplate 146 may include mounting features 158 to facilitate assembly of the trim panel 50 to the instrument panel 48, or another component of the vehicle 44. A closeout piece 159 may be coupled with the trim panel 50 in order to provide a seamless appearance when the trim panel 50 is assembled onto a vehicle 44.

As illustrated in FIG. 3, the light engine assembly 10 is disposed between the lens B-side 130 and the backplate 146. In some aspects, a light rail 160 is disposed between the light engine assembly 10 and the lens B-side 130. The light rail 160 may nest within the light engine assembly 10 such that the light rail 160 can be snapped into the light trough 14. The light rail 160 may include a plurality of depressions 161 configured to reflect light towards the lens 122. The light engine assembly 10 may include first and second end caps 162, 166. Optionally, a wiring unit, or wiring harness 168, is electrically coupled with the light engine assembly 10 to provide a source of power. However, any suitable source of power (e.g. batteries, etc.) may be used.

Figure 5:
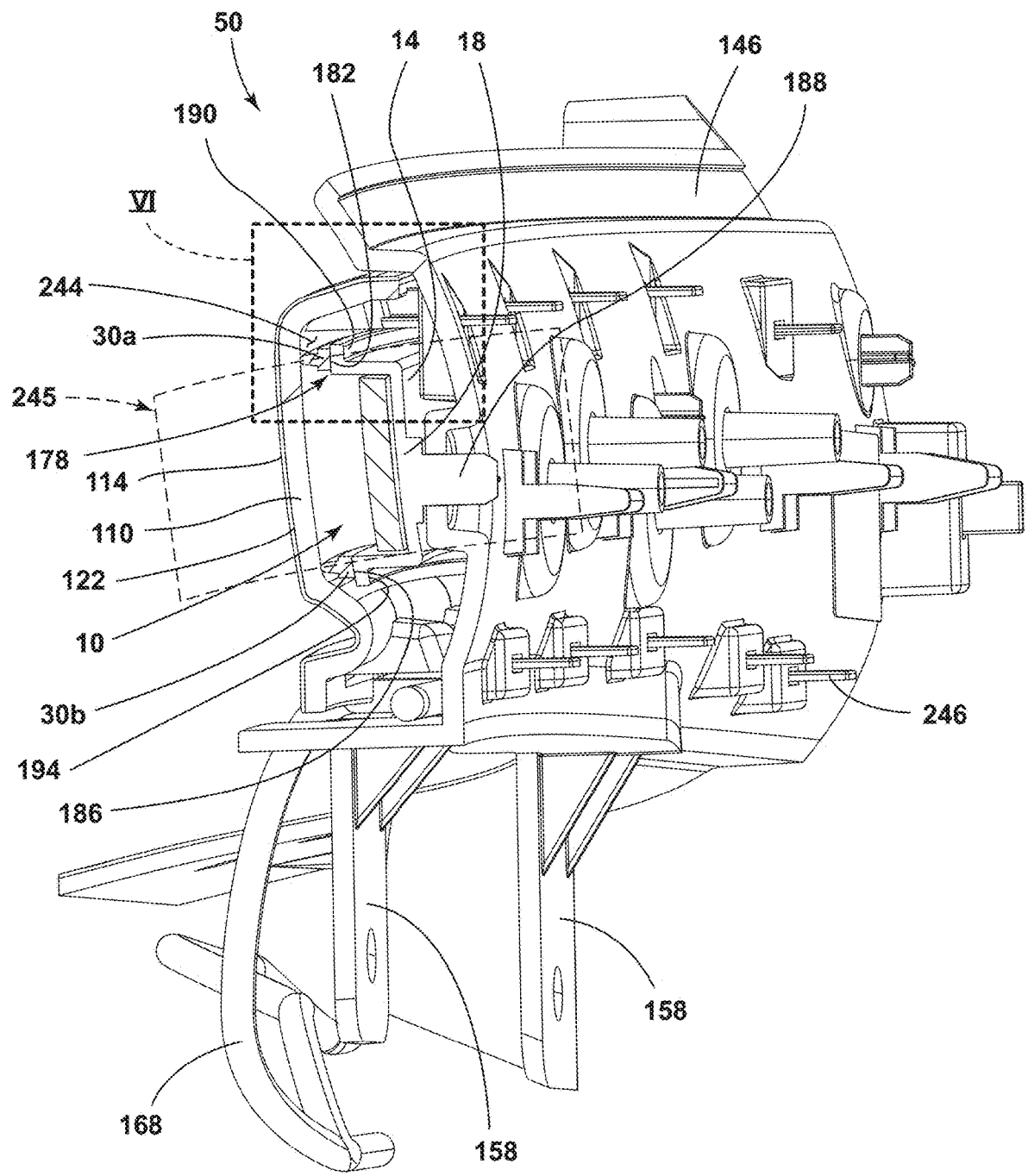
FIG. 5 is cross-sectional view of the vehicle trim panel of FIG. 2 taken along line V-V.

Referring now to FIGS. 4A and 4B, perspective views of the light engine assembly 10 are illustrated with the first and second end caps 162, 166 (FIG. 4A) and without the first and second end caps 162, 166 (FIG. 4B). As illustrated, the light engine assembly 10 may include the light trough 14, the seal 30, and the first and second end caps 162, 166. The light trough 14 includes the trough body 18 defining a perimeter 174, or edge 22. In some aspects, a flange 178, which is best seen in FIG. 5, extends outwardly from the perimeter 174, or edge 22. Further, the trough body 18 may include first and second longitudinal edges 182, 186. First and second flanges 190, 194 may extend along the first and second longitudinal edges 182, 186, respectively. The first and second longitudinal edges 182, 186 may be upper and lower edges. As such, the seal 30 may include first and second seals 30a, 30b, or an upper seal 30a and a lower seal 30b. Further, the trough body 18 may define heat stakes 188 extending from a B-side 189 thereof. While illustrated as having first and second seals 30a, 30b, it is within the scope of the disclosure for the seal 30 to include a single, continuous seal along the perimeter 174, which may be generally rectangular.

As illustrated, the first end cap 162 is coupled with a first end 198 of the light trough 14 and the second end cap 166 is coupled with a second end 202 of the light trough 14. In some aspects, the first and second end caps 162, 166 are snap-fit onto the first and second ends 198, 202, respectively. The first end cap 162 defines a first end cap body 206 having a first end seal 210. The second end cap 166 defines a second end cap body 214 having a second end seal 218. The first and second end seals 210, 218 are bonded to, or integral with the first and second end cap bodies 206, 214, respectively. In some aspects, the first and second end seals 210, 218 align with the first and second seals 30a, 30b, thereby forming a continuous perimeter 174. Accordingly, the first and second end seals 210, 218 may include the same shape, or configuration, as the first and second seals 30a, 30b.

The lighting unit 38 may be in the form of a printed circuit board (PCB) configured to emit light and illuminate the light engine assembly 10. In some aspects, a first PCB 222 nests, or is disposed, within a slot 226 on the first end 198 and a second PCB 230 is disposed within a slot 234 on the second end 202 of the light trough 14. In this way, the slots 226 and 234 aid in retaining the first and second PCBs 222, 230 in position. Additionally, the first and second end caps 162, 166 may also be configured to aid in fixing the first and second PCBs 222, 230 in position.

Figure 6:
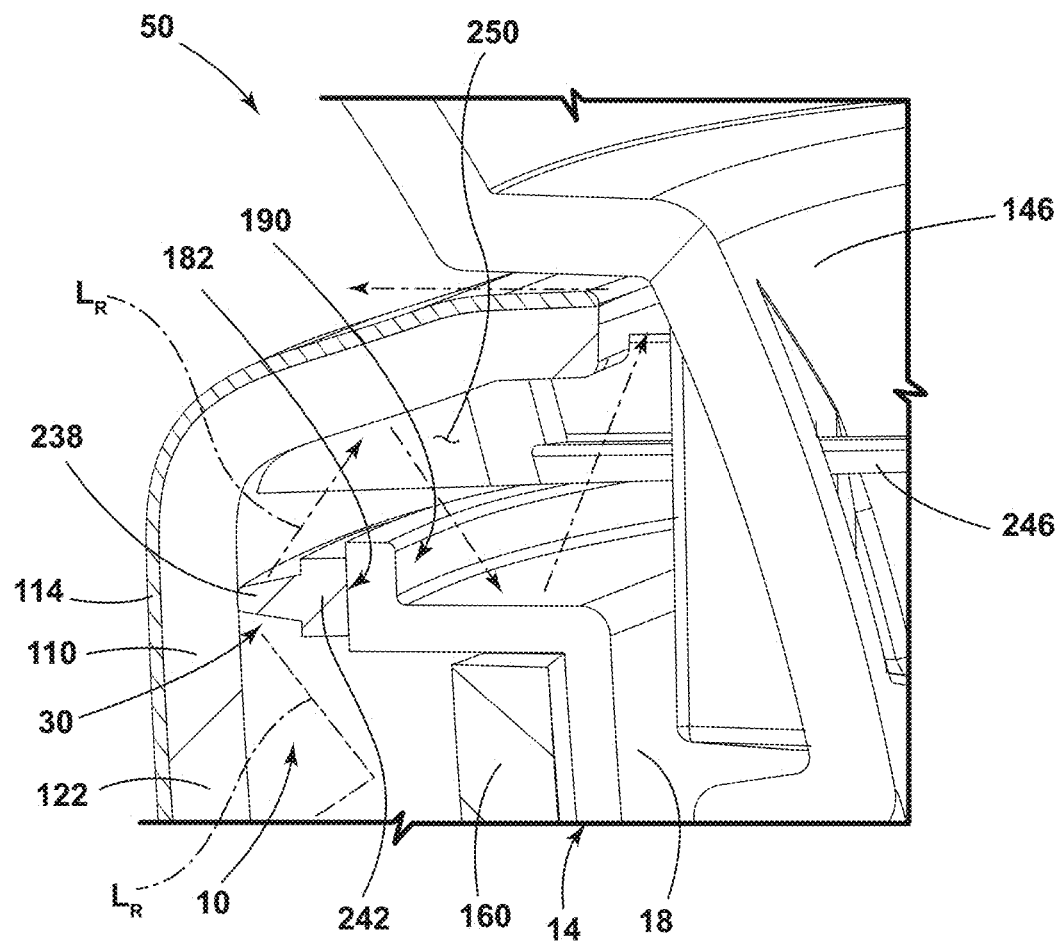
FIG. 6 is an enlarged view of a portion of the vehicle trim panel of FIG. 5 taken along line VI.

Turning to FIGS. 5 and 6, first and second seals 30a, 30b are more clearly illustrated. As illustrated, the first and second seals 30a, 30b include a tapered end 238, which is configured to contact the lens B-side 130, and a collar portion 242, which is bonded to the flange 190, or edge. An opaque coating, such as a blackout paint 244, may be applied to unlit portions of the lens B-side defining illumination boundary 254. The blackout paint 244 can prevent readthrough of refracted light from the light engine assembly 10 on portions of the lens 122 which are not intended to be illuminated (e.g. portions of the lens 122 outside of the illumination boundary 254 around the light engine 10).

In some implementations, the backplate 146 is shaped such that the backplate 146 curves around the lens 122. The substrate 110 may include a plurality of tabs 246 configured provided extend through the apertures 150. The heat stakes 188 may be configured to extend through the apertures 154. Heat may be applied to the tabs 246 and heat stakes 188 to join, or weld, the substrate 110, the light engine assembly 10 and the backplate 146 together, thereby assembling the trim panel 50.

FIG. 6 illustrates hypothetical reflected light $L_R$. The seal(s) 30, 30a, 30b prevent(s) light from the lighting unit(s) 38 from leaking to an exterior side 250 of the light trough 14 when the seal 30 is coupled with the lens 122 in an assembled state, which may include directly coupled with the lens 122. In some examples, the seal 30 contacts the appliqué 118, which may be disposed on the lens B-side 130. Conventionally, glue or tape is used to adhere a light trough with a substrate. However, these materials can result in reflected light from within the light trough to leak beyond boundaries of the light trough. The seal 30 is configured to retain light within the boundaries of the light trough 14 to preserve lumens and, therefore, conserve energy.

Figure 7:
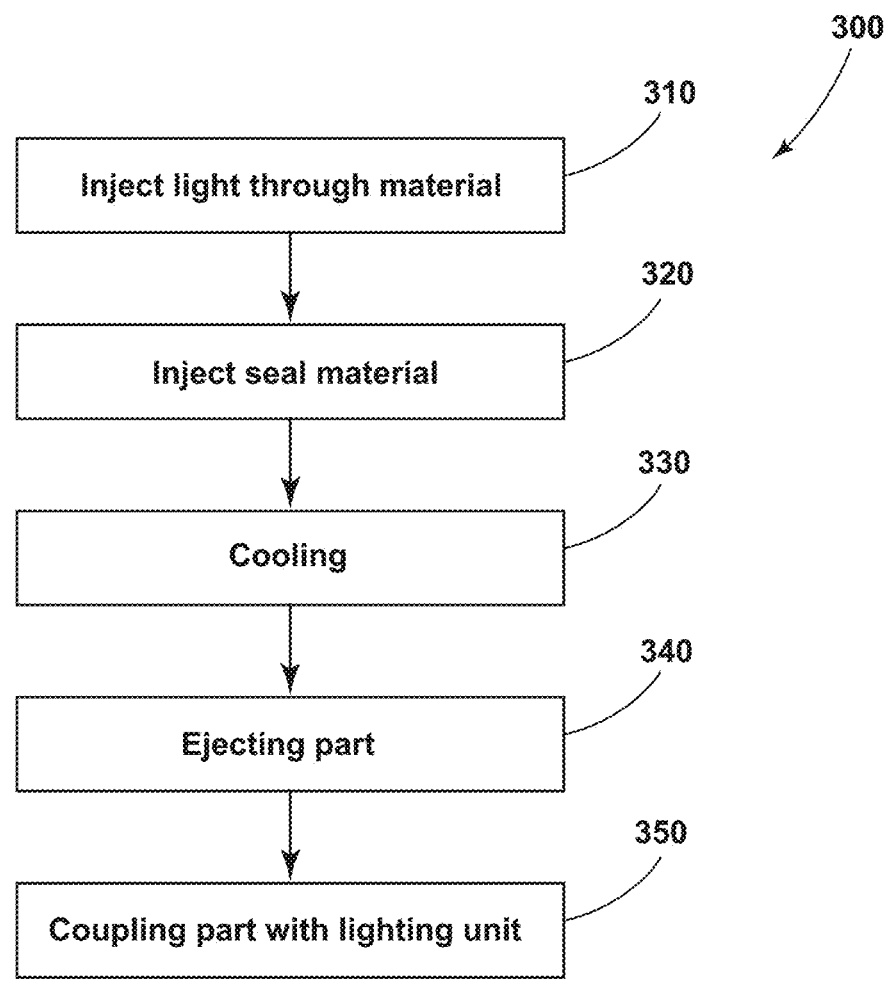
FIG. 7 is a flow chart illustrating a method for forming the light engine assembly, according to various examples.

Referring now to FIG. 7, an embodiment of a method 300 for forming the light engine assembly 10 according to an injection molding process is illustrated. In the illustrated embodiment, the method 300 for forming the light engine assembly 10 begins in step 310 with injecting a light trough material into a mold or at step 320 with injecting a seal material into the mold. In step 310, the light trough 14 including the trough body 18 having the edge 22 is formed.

In some examples, the flange 178 extending along the edge 22 is formed. Optionally, in step 310 the edge 22 further includes the first and second longitudinal edges 182, 186. Likewise, the first and second flanges 190, 194 extending along the first and second longitudinal edges 182, 186, respectively, may also be formed. Step 310 may also include forming at least one heat stake 188 projecting from the B-side 189 of the trough body 18. Step 310 may be completed using a single shot of light trough material.

In step 320, the seal 30 (30a, 30b) configured to bond with the edge(s) 22 (182, 186) of the trough body 18 is formed. While illustrated as step 320 following step 310, it is within the scope of the disclosure for the method 300 to begin with either step 310 or 320. For example, the light trough 14 may be formed first and the seal 30 formed next, or the seal 30 may be formed first and the light trough 14 formed next. In the implementation where first and second longitudinal edges 182, 186 are formed in step 310, step 320 includes forming the first and second seals 30a, 30b, which are configured to couple the first and second longitudinal edges 182, 186 and/or the first and second flanges 190, 194, if present, of the trough body 18, respectively. Step 320 may be completed using a single shot of seal material.

Once both steps 310 and 320 are complete, at step 330, cooling one of the light trough material and the seal material is conducted. In some examples, the other one of the light trough material and the seal material is cooled prior to step 330. For example, if step 310 is completed prior to step 320, the seal material may be the last material to be cooled. Though, it is also within the scope of the disclosure to cool the light trough material and the seal material simultaneously. The seal material is different from, yet compatible with the light trough material. Accordingly, a bond (e.g. molecular bond, covalent bond, etc.) can be formed between the light trough material and the seal material. In some aspects, the light trough material includes a plastic (e.g. ABS) and the seal material includes an elastomer (e.g. ethylene propylene rubber). The material properties of the seal 30 may prevent squeaking and rattling in an assembled state. As the light trough material and seal material are solidified, step 330 provides for forming a unitary light trough part 34. In some examples, the unitary light trough part 34 is fully polymerized.

Next, at step 340 the light trough part 34 is ejected from the mold. At step 350, the light trough part 34 is coupled with a lighting unit 38, which results in formation of the light engine assembly 10. In some examples, the light trough part 34 is coupled with two or more lighting units 38, as previously discussed with respect to FIG. 4B.

Additionally, the method 300 may include the steps of assembling the light engine assembly 10 on the vehicle trim panel 50. The trim panel 50 may further be coupled with the instrument panel 48, or any other component of the vehicle 44 as previously discussed with respect to FIG. 1. Additionally, the method 300 may include the step of coupling the light engine assembly 10 with the lens 122 and the backplate 146, thereby forming a light bar and coupling the light bar with the trim panel 50.

The method 300 may further include an injection molding process for forming the end caps 162, 166 and the first and second end seals 210, 218. The process may begin with the step of injecting an end cap material into an end cap mold thereby forming the end cap 162 or 166. As previously discussed, each end cap 162, 166 is configured to couple an end 198, 202 of the trough body 18. An end seal material may be injected into the end cap mold, thereby forming the end seal 210 or 218 configured to couple the first and second seals (30a, 30b) of the light trough part 34. In some aspects, the end seal material is the same material as the seal material used in step 320. Alternatively, the end seal material is different from the seal material in step 320. Similar to steps 310 and 320, injecting an end cap material into an end cap mold and injecting the end seal material into the end cap mold may each be performed with a single shot of material.

Cooling one of the end cap material and the end seal material may be conducted to form a bond between the end cap material and the seal material, thereby forming a unitary end cap part. In some examples, the unitary end cap part is fully polymerized. Then, the end cap part can be ejected and coupled with the light trough part 34 formed at step 330. Further, the method 300 may include coupling a first end cap part with the first end 198 of the light trough part and coupling a second end cap part with the second end 202 of the light trough part.

While the method 300 describes two-shot injection molding processes in which the light trough part 34 and the end cap parts are not ejected from their respective molds between the two shots of materials, it is within the scope of the disclosure to manufacture any of the components described herein using any suitable process. Optional process include, but are not limited to: over-molding, additive manufacturing and the like.

The present disclosure may provide a variety of advantages. For example, the light engine assembly 10 is configured to retain light within the boundaries of the light trough 14 to preserve lumens and, therefore, conserve energy. Further, the method disclosed herein for forming the light engine assembly 10 in a two-shot injection molding process provides an effective process for manufacturing the light engine assembly 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for forming a light engine assembly for a vehicle trim panel, comprising the steps of:
    injecting a light trough material into a trough mold, thereby forming a light trough including a trough body having first and second longitudinal edges;
    injecting a seal material into the trough mold, thereby forming first and second seals configured to couple the first and second longitudinal edges of the trough body, respectively, wherein the seal material is different from and compatible with the light trough material;
    cooling one of the light trough material and the seal material to form a bond between the light trough material and the seal material, thereby forming a unitary light trough part;
    ejecting the light trough part;
    coupling a lighting unit with the light trough part; and
    assembling the light engine assembly on the vehicle trim panel.

2. The method of claim 1, further comprising the steps of:
    injecting an end cap material into an end cap mold, thereby forming an end cap configured to couple an end of the trough body;
    injecting a seal material into the end cap mold, thereby forming an end seal configured to couple the first and second seals of the light trough part, wherein the seal material is different from and compatible with the end cap material;
    cooling one of the end cap material and the seal material to form a bond between the end cap material and the seal material, thereby forming a unitary end cap part;
    ejecting the end cap part; and
    coupling the end cap part with the light trough part.

3. The method of claim 2, wherein the step of coupling the end cap part with the light trough part further comprises:
    coupling a first end cap part with a first end of the light trough part; and
    coupling a second end cap part with a second end of the light trough part.

4. The method of claim 1, wherein the step of injecting the light trough material into the trough mold further comprises:
    forming at least one heat stake projecting from a B-side of the trough body.

5. The method of claim 1, wherein the light trough material comprises a plastic and the seal material comprises an elastomer.

6. The method of claim 1, wherein the first and second seals prevent light from the lighting unit from leaking to an exterior side of the light trough when the first and second seals are directly coupled with a lens.

7. The method of claim 1, wherein the vehicle trim panel is coupled with an instrument panel.

8. A method for forming a light engine assembly, comprising the steps of:
    injecting a light trough material into a mold, thereby forming a light trough including a trough body having a perimeter defining an edge;
    injecting a seal material into the mold, thereby forming a seal configured to bond with the edge of the trough body;
    cooling one of the light trough material and the seal material to adhere the light trough material to the seal material, thereby forming a unitary light trough part;
    ejecting the light trough part; and
    coupling a lighting unit with the light trough part.

9. The method of claim 8, wherein the step of injecting the light trough material into the mold further comprises:
    forming at least one heat stake projecting from a B-side of the trough body.

10. The method of claim 8, wherein the light trough material comprises a plastic and the seal material comprises an elastomer.

11. The method of claim 8, wherein the seal prevents light from the lighting unit from leaking to an exterior side of the light trough when the seal is directly coupled with a lens.

12. The method of claim 8, further comprising the steps of:
    coupling the light engine assembly with a lens and a backplate, thereby forming a light bar; and
    coupling the light bar with a vehicle trim panel.

13. A vehicle trim panel, comprising:
    a lighting assembly, comprising:
        a lens having a body defining a lens A-side that faces a vehicle cabin and a lens B-side;
        a light engine comprising:
            a light trough including a trough body defining a perimeter and made from a light trough material;
            a seal bonded to the perimeter and made from a seal material, wherein a seal material is different from and compatible with a light trough material; and
            a lighting unit disposed within the trough body and configured to emit light; and
        a backplate, wherein the light engine is disposed between the lens B-side and the backplate and the seal is disposed between the lens B-side and the perimeter of the light trough to prevent emitted light from the lighting unit from leaking to an exterior side of the light trough.

14. The vehicle trim panel of claim 13, wherein the vehicle trim panel is coupled with an instrument panel.

15. The vehicle trim panel of claim 13, further comprising:
   an applique disposed on the lens including a pattern having optically transparent portions, wherein emitted light from the lighting unit is transmitted through the transparent portions.

16. The vehicle trim panel of claim 13, wherein the light engine further comprises:
   a first end cap defining a first end cap body and having a first end seal coupled with a first end of the light trough; and
   a second end cap defining a second end cap body having a second end seal coupled with a second end of the light trough, wherein the first and second end seals are bonded to the first and second end cap bodies, respectively.

17. The vehicle trim panel of claim 16, wherein the seal bonded to the perimeter of the light trough further comprises:
   an upper seal; and
   a lower seal, wherein the first and second end seals align with the upper seal and the lower seal, thereby forming a continuous perimeter.

18. The vehicle trim panel of claim 13, wherein the seal material and light trough material are bonded at the perimeter of the trough body, thereby forming a unitary part.

19. The vehicle trim panel of claim 13, wherein the light engine seal directly contacts the lens B-side.

20. The vehicle trim panel of claim 13, wherein the light engine further comprises:
   a light rail disposed between the light engine and the lens B-side, wherein the light engine seal directly contacts the light rail.

* * * * *